UNITED STATES PATENT OFFICE.

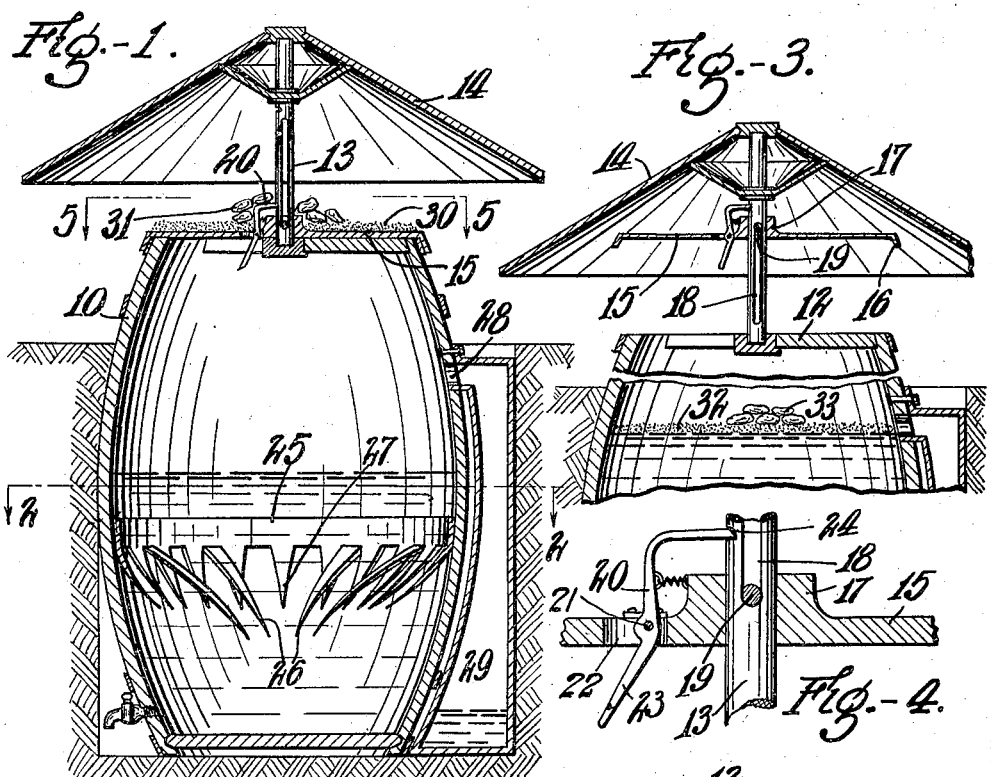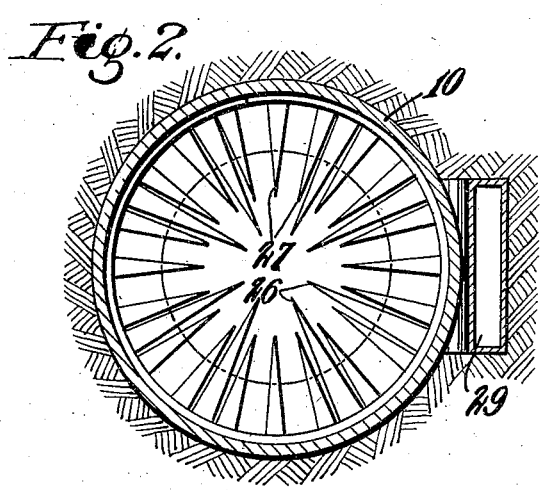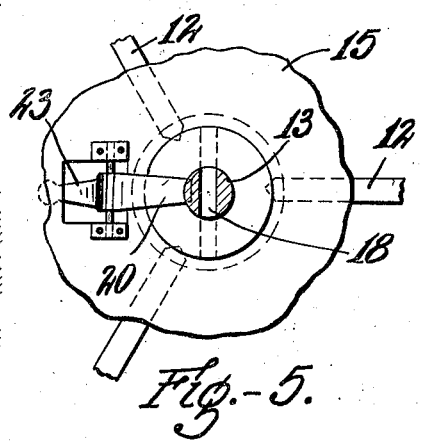

JOZEF KASPRZYK, OF LANCASTER, PENNSYLVANIA.

ANIMAL-TRAP.

1,395,680.        Specification of Letters Patent.        Patented Nov. 1, 1921.

Application filed May 20, 1921. Serial No. 471,118.

*To all whom it may concern:*

Be it known that I, JOZEF KASPRZYK, citizen of Poland, residing at Lancaster, in the county of Lancaster and State of Pennsylvania, have invented certain new and useful Improvements in Animal-Traps, of which the following is a specification.

This invention relates to animal traps being intended more particularly for embodiment in mouse or rat traps or traps for similar small animals, and its has for an object to provide a novel and improved construction for a trap of this sort.

For further comprehension of the invention, and of the objects and advantages thereof, reference will be had to the following description and accompanying drawings, and to the appended claims in which the various novel features of the invention are more particularly set forth.

Figure 1 of the drawings is a vertical sectional view of an animal trap constructed according to the invention.

Fig. 2 is a horizontal section on the line 2—2 of Fig. 1.

Fig. 3 is a fragmentary vertical section showing certain of the parts in a different position to that shown in Fig. 1.

Fig. 4 is an enlarged fragmentary vertical section showing the means for holding the displaceable cover in raised position.

Fig. 5 is a fragmentary horizontal section on the line 5—5 of Fig. 1.

My improved animal trap comprises a barrel 10 which may be of ordinary construction and which is preferably sunk for the major part of its length into the ground. Extending across the upper end of this barrel is a spider 12 which supports a post 13. Upon the top of this post is mounted a conical hood 14 which covers the barrel and is spaced above the latter.

In connection with the trap I provide a cover member 15 for the barrel 10 which at certain times may rest thereon and at other times be raised thereabove. This cover member is in the form of a disk having a depending edge flange 16 and a central hub 17 through which the post 13 passes freely, the post being vertically slotted as at 18 and the hub 17 carrying a pin 19 which passes freely through this slot. To hold the cover 15 in raised position I provide a latch arm 20 pivoted as at 21 in an opening 22 in the cover 15 and having a handle 23 extending down through said opening to permit of operation of the latch when the cover is closed. The post has a notch in its upper end in which the latch engages to hold the cover in raised position.

Within the barrel 10, at a distance from the top thereof, is a ring or band 25 formed with the downwardly converging resilient prongs 26 and 27 the former of which are relatively long and the latter relatively short.

The barrel 10 is adapted to contain water to a point above the band 25, being provided with an overflow outlet 28 which leads into an overflow receptacle 29 arranged beside the barrel, the purpose of this overflow device being to maintain the water at a constant level in the barrel.

The manner in which my improved animal trap is used is as follows: The cover 15 is arranged in position on top of the barrel 10 and is covered with sawdust or such material as indicated at 30 and suitable bait as 31 is placed thereon. The trap is left as thus arranged for a time, the animals being attracted by the bait and finally losing their fear of approaching the same. The cover 15 may then be raised, the latch arm 20 engaging in the notch 24 in post 13 and holding the cover in the raised position.

The water in the barrel is then covered with sawdust as at 32 and some bait 33 placed thereon and the animals, having lost their fear of stepping on the sawdust will jump down thereon to reach the bait, sinking into the water and passing between the prongs 26, 27 which prevent their rising to the surface.

My improved trap may be used to advantage in poultry yards or the like, and it will be understood that the spacing between the hood 14 and the top of the barrel, while sufficient to allow of the passage of rats and mice or like animals will not be sufficient to permit of passage of the poultry.

Having thus described my invention what I claim as new and desire to protect by Letters Patent of the United States is as follows:—

1. An animal trap comprising a barrel, a hood supported above said barrel, a cover element adapted to rest on said barrel or be raised above the latter, a spider element extending across the top of the barrel, a post on the spider element extending through said cover element and formed with a notch, and a latch arm hinged on said barrel and adapted to engage in said notch to hold the cover in raised position.

2. An animal trap comprising a barrel, a hood supported above said barrel, a cover element adapted to rest on said barrel or be raised above the latter, a spider element extending across the top of the barrel, a post on the spider element extending through said cover element and formed with a notch, and a latch arm hinged on said barrel and adapted to engage in said notch to hold the cover in raised position, and downwardly and inwardly converging prongs in said barrel.

3. An animal trap comprising a barrel, downwardly and inwardly converging prongs in said barrel, said barrel having an overflow outlet above said prongs, and an overflow receptacle communicating with said outlet.

In testimony whereof I have affixed my signature.

JOZEF KASPRZYK.